Dec. 11, 1934.　　　　O. A. SCHMITT　　　　1,983,570

INTERMITTENT MOTION TRANSMITTING DEVICE

Filed Nov. 24, 1933　　　7 Sheets-Sheet 1

Dec. 11, 1934.  O. A. SCHMITT  1,983,570
INTERMITTENT MOTION TRANSMITTING DEVICE
Filed Nov. 24, 1933  7 Sheets-Sheet 2

Inventor
Otto A. Schmitt
By Sturtevant, Mason & Porter
Attorneys

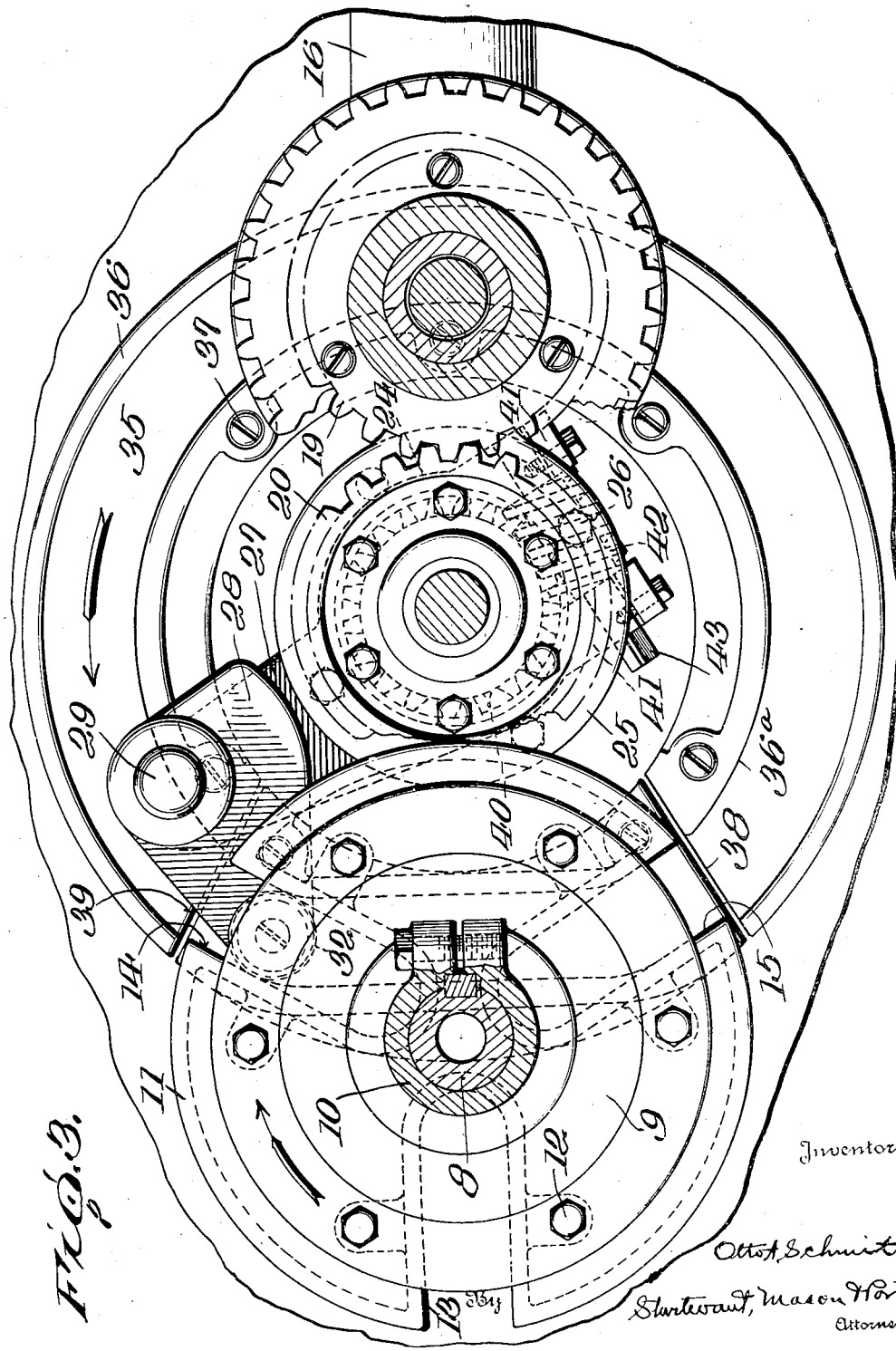

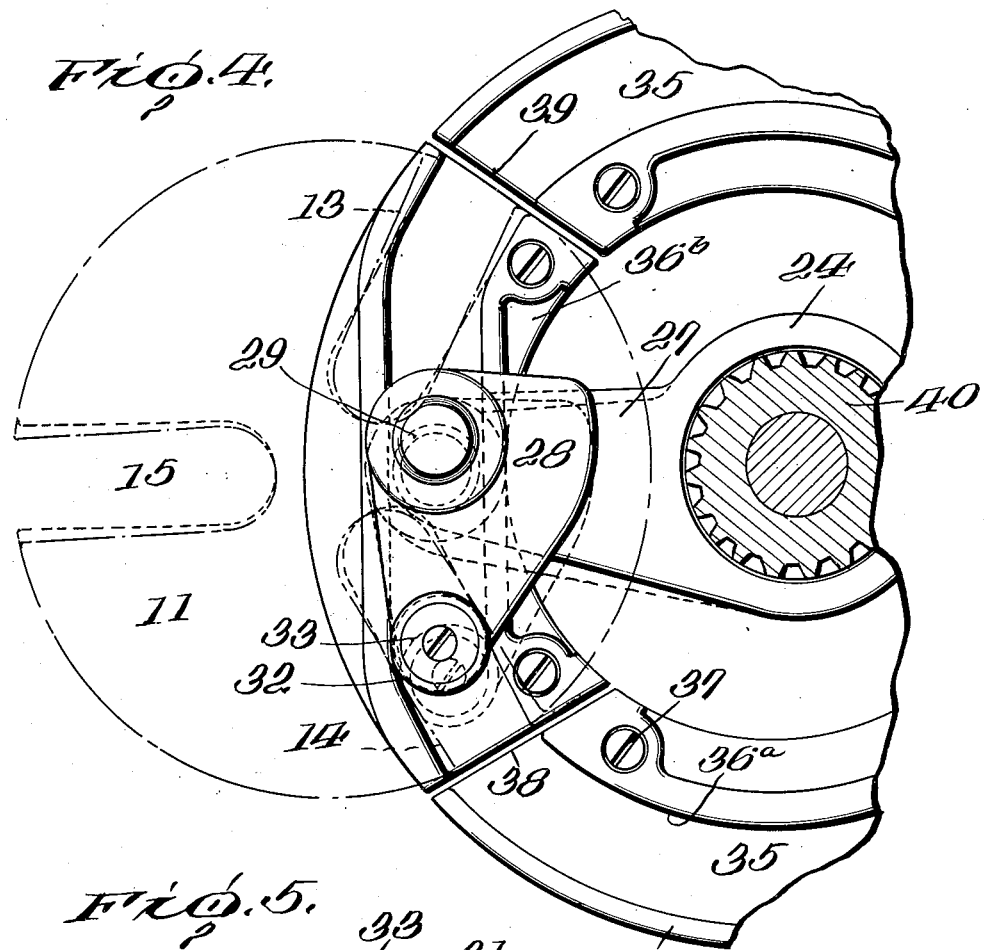
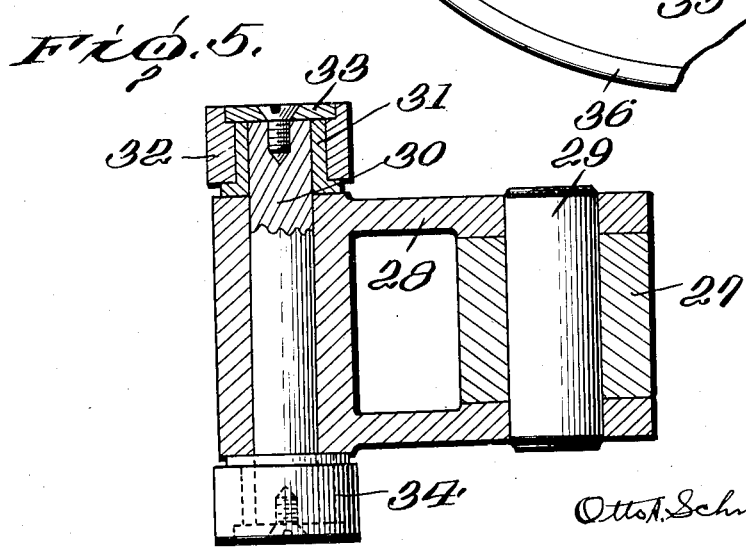

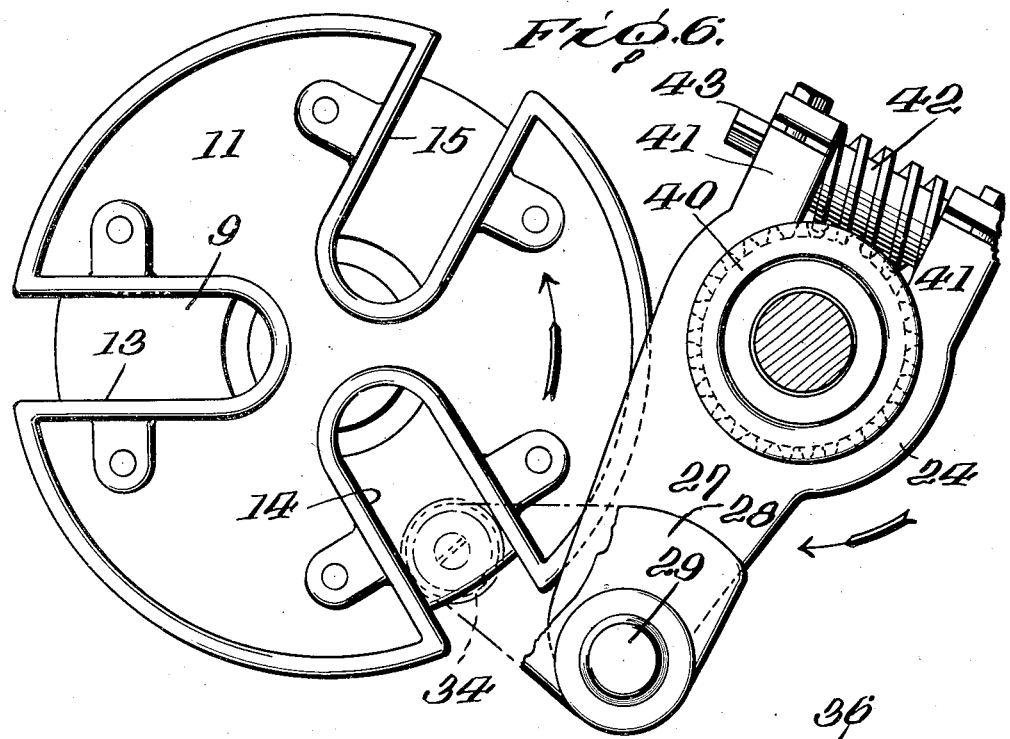
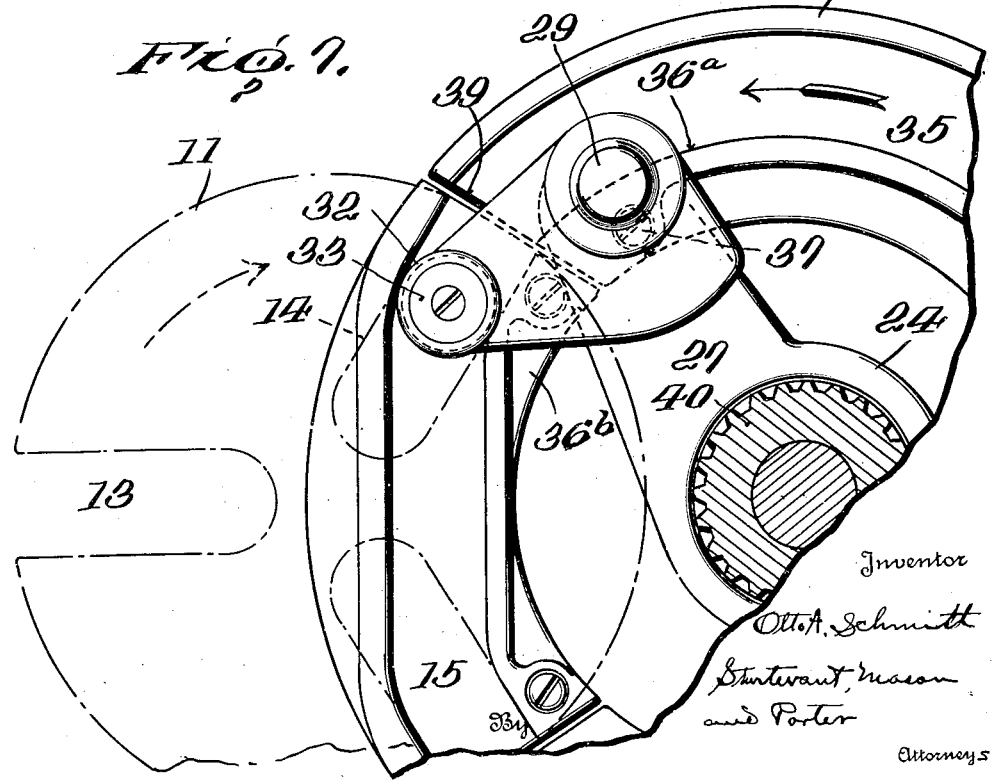

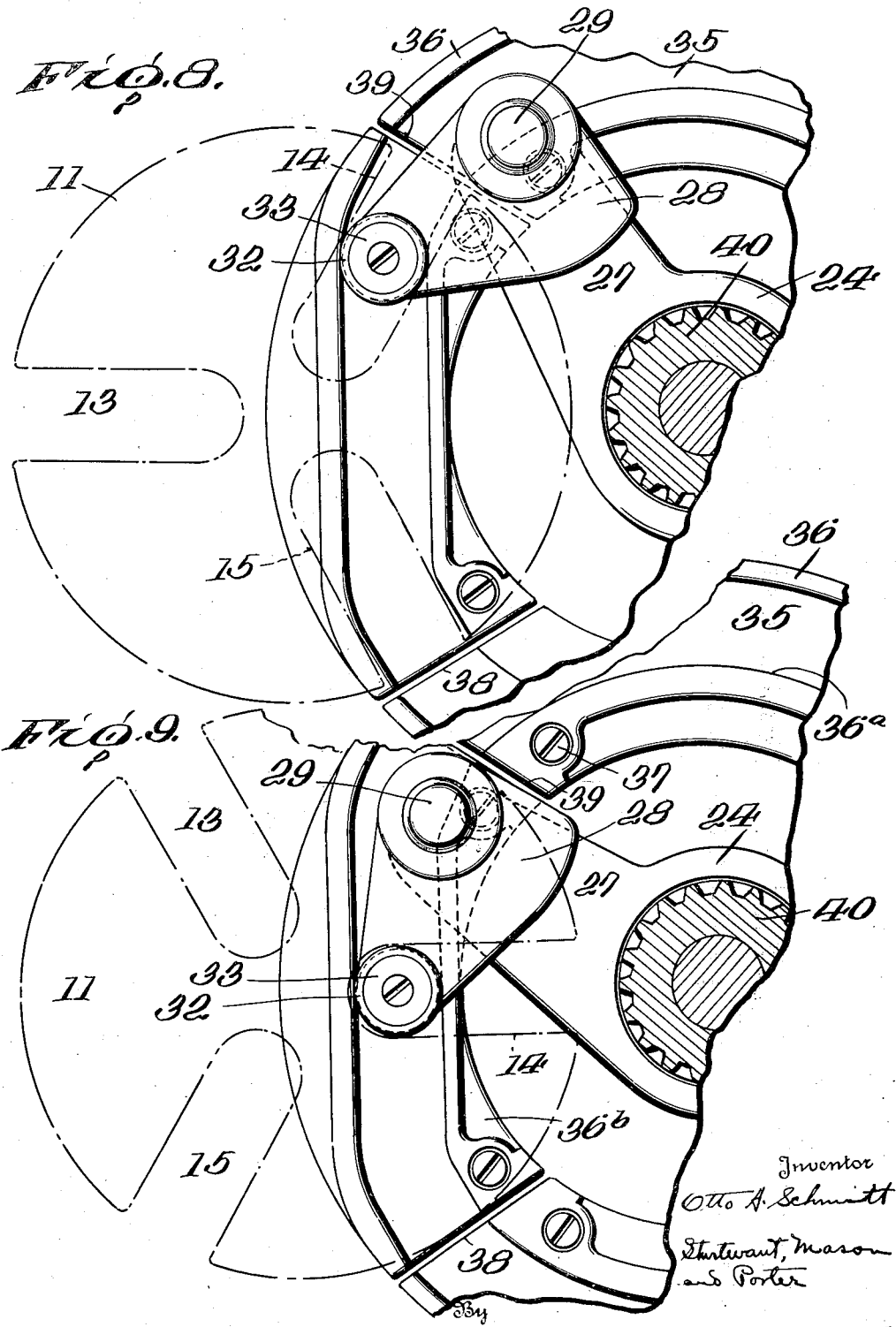

Dec. 11, 1934.                O. A. SCHMITT                1,983,570
INTERMITTENT MOTION TRANSMITTING DEVICE
Filed Nov. 24, 1933          7 Sheets-Sheet 7
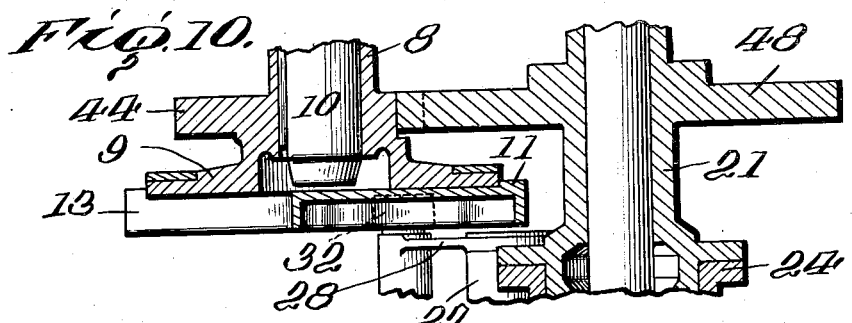
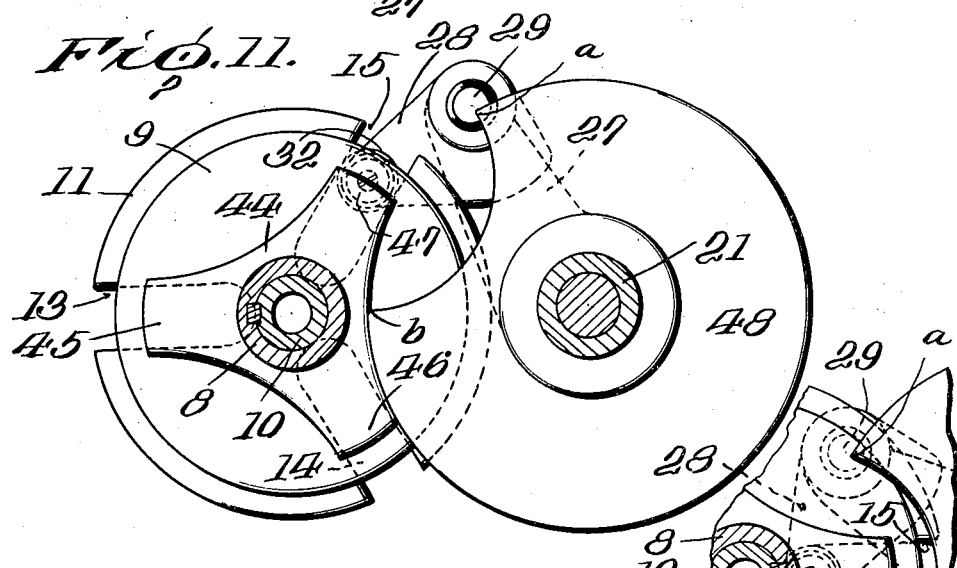
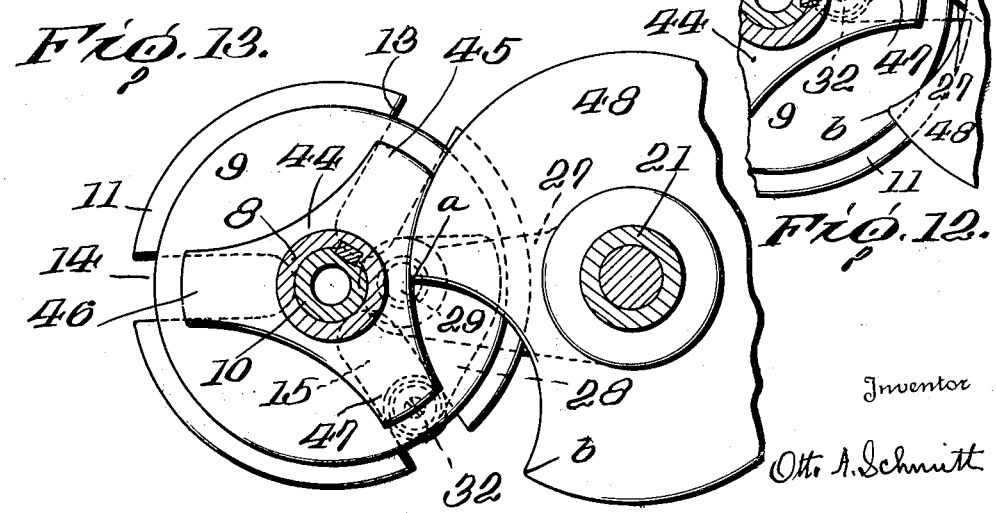
Inventor
Otto A. Schmitt
By Sturtevant, Mason & Porter
Attorneys Patented Dec. 11, 1934

1,983,570

UNITED STATES PATENT OFFICE 1,983,570

INTERMITTENT MOTION TRANSMITTING DEVICE

Otto A. Schmitt, Syracuse, N. Y., assignor to Continental Can Company, Inc., New York, N. Y., a corporation of New York Application November 24, 1933, Serial No. 699,601

5 Claims. (Cl. 74—436)

The invention relates to new and useful improvements in a motion transmitting device, and more particularly to a device for imparting intermittent rotation to a driven member from a continuously rotating driving member.

An object of the invention is to provide a means for imparting intermittent rotation to a driven wheel having radial slots into and out of which the driving member moves, wherein the driving member is so constructed and operated that said radial slots may be disposed at substantially one hundred and twenty degrees apart.

Another object of the invention is to provide a means for imparting rotation to a driven wheel having radial slots into and out of which the driving member moves, wherein the driving member is so constructed and operated as to give said rotated wheel a relatively quick starting movement and a relatively slow stopping movement.

A still further object of the invention is to provide a means for imparting intermittent rotation to a driven wheel having radial slots into and out of which the driving member moves, wherein the driving member is continuously rotated at a given angular speed, and is moved radially of the axis of rotation thereof for varying the speed of movement imparted to said driving wheel.

These and other objects will in part be obvious and will in part be hereinafter more fully disclosed.

In the drawings which show one embodiment of the invention—

Fig. 3 is a view partly in section and partly in bottom plan of the motion transmitting mechanism as embodied in this machine;

Fig. 4 is a view partly in plan and partly in horizontal section showing the elements of the driving device, and showing in broken lines the driven wheel of the intermittently rotated member;

Fig. 5 is a vertical sectional view through the operating arm and the laterally projecting means supporting the operating roll which imparts intermittent movement to the driven wheel;

Fig. 6 is a bottom plan view showing the driving wheel and the operating arm therefor, also a portion of the actuating device carried by said operating arm;

Fig. 7 is a top plan view with parts in section showing the continuously rotating member with its driving device and the control cam therefor, also showing in broken lines the intermittently rotated member, the parts being disposed so that the rotated member is just beginning its movement;

Fig. 8 is a view similar to Fig. 7, but showing the turret as rotated through a slight angular movement and the beginning of the shifting of the operating roll radially of the actuating member carrying the same;

Fig. 9 is a view similar to Fig. 8, but showing the maximum acceleration of the rotated member;

Fig. 10 is a vertical sectional view showing a modified form of the invention wherein a Geneva locking mechanism is used for preventing the driven member from turning when released;

Fig. 11 is a plan view of the parts shown in Fig. 10, and showing the beginning of the releasing of the driven member so that it may be rotated;

Fig. 12 is a view in plan of a portion of Fig. 11, showing the driven member as completely released and having turned through sixty degrees of its cycle of movement, and Fig. 13 is a view similar to Fig. 11, but showing the parts as having turned so that the driven member is again locked from movement while it is released by the driving member.

The invention is directed to a motion transmitting device wherein a continuously rotating part imparts intermittent movements to a rotated member. Attached to the rotated member is a driving wheel having radial slots formed therein opening at the periphery of the wheel. These radial slots, in the present illustrated embodiment of the invention, are one hundred and twenty degrees apart. The driving mechanism for this intermittently rotated wheel includes an arm which is continuously rotating. Attached to the outer end of the arm is a laterally projecting bracket which is pivoted to the arm, and this bracket normally extends approximately at right angles to the arm. Mounted on the outer end of the bracket is a roll which is adapted to move first into one radial slot and then out of the same and into the next radial slot for imparting an intermittent rotation to said driven member. Associated with the rotating member is a control cam, the greater portion of which is concentric to the axis of rotation of the arm.

At the outer end of the bracket arm is a roll which runs in the control cam. The control cam is shaped so as to shift this laterally projecting bracket, and thereby move the actuating roll which engages a slot in the driving wheel toward and from the center of rotation of the arm. While the arm rotates at a uniform angular speed, the shifting of the bracket will vary the speed of movement imparted to the intermittently rotated wheel. When the roll is shifted toward the center of rotation of the arm, it will increase the speed of movement imparted to the driven wheel, and when it is moved outward, then it will decrease the speed of movement imparted to the driven wheel. While the movement given to a driven wheel through an operating mechanism of the type described is a movement that is accelerated to a maximum, and then decelerated until the driven member stops, by this shifting of the roll, a variable acceleration and deceleration may be obtained.

It is thought the invention will be better understood by a detail description of the present illustrated embodiment thereof, it being understood, however, that the intermittent motion transmitting device may be used wherever it is desired to impart an intermittent rotation to a member from a continuously rotated actuating shaft.

Figure 1:
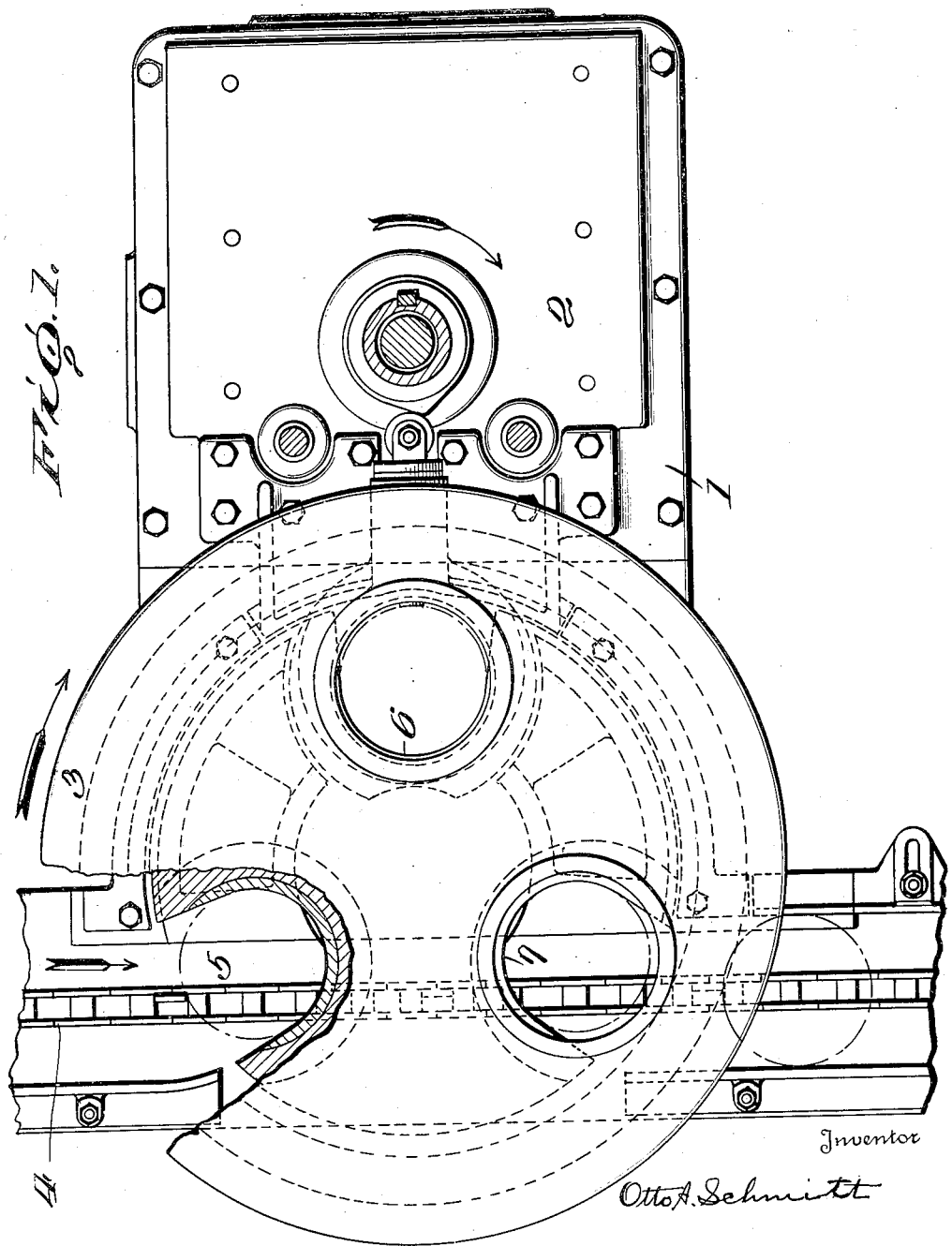
Figure 1 is a view in plan showing the turret of a can closing machine to which an intermittent rotation is imparted by my improved motion transmitting device.

In Fig. 1 of the drawings, there is shown a portion of a can making machine which includes a supporting base 1 carrying a framework 2, and supported for rotation on this framework is a turret 3. Cans are conveyed by a conveying means 4, one at a time, into a pocket in the turret, and then are conveyed by the turret to an operating station, after which the can is removed from the operating station and positioned so as to be again taken from the pocket by the conveyor. The pocket 5 of the turret is receiving a can, while the pocket 6 is positioning a can for operation thereupon by the machine, and the pocket 7 is positioning a can for discharge from the turret. The present invention has to do with a means for intermittently rotating this turret. The can closing machine which is shown in part only in the drawings, is described in detail in an application of Alfred L. Kronquest, filed November 15, 1933, Serial No. 698,206.

Figure 2:
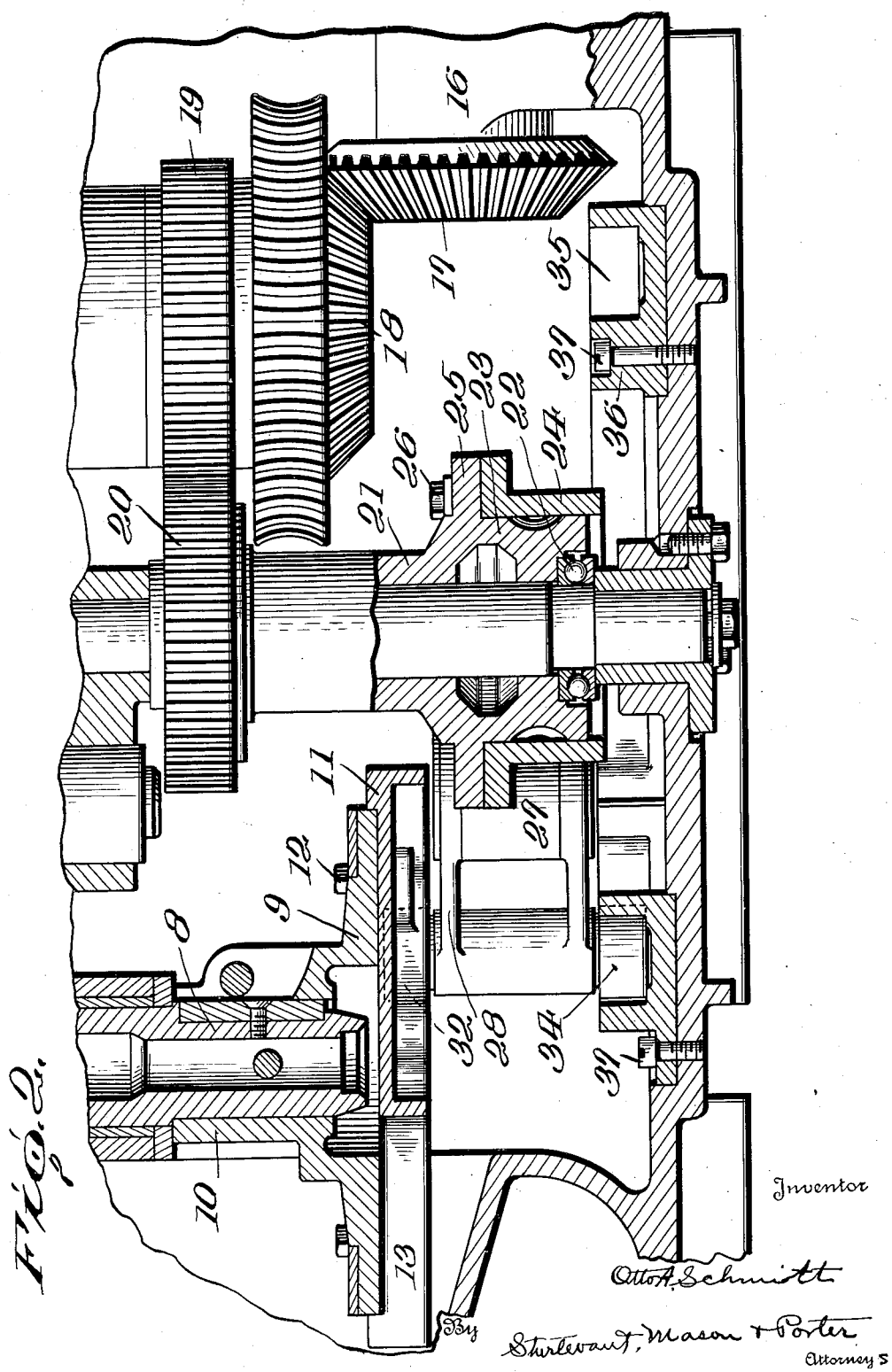
Fig. 2 is a vertical sectional view through the lower part of the machine, and showing the motion transmitting device which converts the rotary motion of a continuously operated actuating shaft into an intermittent rotation of the turret.

The turret 3 is carried by a supporting sleeve shaft 8 which is mounted for rotation in suitable bearings in the machine. Mounted on the lower end of this shaft 8 is a disk or spider 9 which is preferably formed integral with a hub sleeve 10, and this hub sleeve is keyed to the lower end of the shaft 8. Attached to the lower face of this spider or disk 9 is a driving wheel 11 which imparts an intermittent rotation to the turret. Said driving wheel is secured to the disk or spider 9 by suitable bolts 12. This driving wheel 11 is provided with three radial slots 13, 14 and 15. Each slot opens at the periphery of the driving wheel. The driving wheel is shown in bottom plan view in Fig. 6 of the drawings. The radial slots terminate short of the center of the wheel, and these radial slots are spaced so that the center lines thereof are one hundred and twenty degrees apart. Intermittent rotation is imparted to this wheel from an actuating shaft 16 (see Fig. 2). This actuating shaft carries a bevel gear 17 meshing with a bevel gear 18 on a vertical shaft which in turn carries a gear 19 meshing with a gear 20. This gear 20 is fixed to a sleeve shaft 21 supported by a ball bearing 22. Said sleeve shaft is provided with a hub 23 which carries a ring or collar 24. Said ring or collar engages the under face of a projecting flange 25 and is secured thereto by bolts 26 which pass through the flange and are threaded into the ring or collar 24. These bolts pass through slots, so that when the bolts are loosened, the ring or collar 24 may be shifted on the hub of the sleeve shaft 21. This ring or collar 24 carries a radially projecting arm 27 and the operating roll for actuating the driving wheel is mounted on this arm. At the outer end of the arm 27 is a laterally projecting bracket 28 which includes an upper plate and a lower plate spaced so as to receive therebetween the arm 27. A pivot pin 29 passes through these plates and the arm and thus pivotally secures this bracket to the outer end of the arm. The bracket is free to turn on this pivotal support on the arm. The bracket is provided with an axle rod 30 which extends beyond the upper face of the bracket 28 and is provided with a bushing 31 on which is mounted a roll 32. Said roll is held in position on the axle by a cap plate 33.

The roll 32 is the driving roll and it moves into first one radial slot in the driving wheel and then out of the same and into the next radial slot. At the lower end of this axle rod is a roll 34 mounted in a manner similar to the roll 32. The rolls are free to turn independently. The roll 34 runs in a cam race 35 formed in a ring 36, which ring is clamped to the base member of the machine by suitable clamping bolts 37, 37. The ring is made in two sections, the section 36a which extends from a line 38 adjacent one side of the driving wheel to a line 39 adjacent the other side of the driving wheel, and a section 36b which is located between these lines 38 and 39. This is for the purpose of permitting the section 36b to be changed. Throughout the section 36a, the race is concentric to the axis of rotation of the arm 27. The race, however, in the section 36b changes from concentric beginning and ending portions to a substantially straight portion which is a chord of the circular path of movement of the center of the pivot pin 29. When the roll 34 is moving in the concentric portion of the race, then the roll 32 will remain at a fixed radial distance from the center of rotation of the arm 27. When, however, this roll 34 is shifted toward the center of rotation of the arm 27 as it passes into the straight portion of the race, then the roll 32 will be moved inwardly toward the center of rotation of the arm 27. Following this, of course, will be an outward movement of the roll 32 as the arm 27 continues to rotate.

In Fig. 7 of the drawings, the roll 32 is shown as having entered the radial slot 14, and as having started the driving wheel on its intermittent rotation. In Fig. 8 of the drawings, the roll 32 is shown as having moved the driving wheel through a slight angular movement, and inasmuch as the roll 34 is passing into the straight portion of the cam race, the roll 32 will be shifted on the arm 27 inwardly toward the center of rotation of said arm. Inasmuch as the roll is moving in toward the center of rotation of the driving wheel, it is accelerating or increasing the angular speed of the driving wheel. This inward movement of the roll 32 through the shifting of the same on the arm 27 will further increase the accelerating movement. This enables the driving wheel to be started quickly. When the roll 32 reaches the position shown in Fig. 9, then the maximum acceleration is being given to the driving wheel and it has moved through one-half of its arc of travel given to said driving wheel in one of the intermittent cycle movements. From this point on, the roll 32 will be moved outward away from the center of rotation of the arm 27, and the movement imparted to the driving wheel will be decelerated, in addition to that which is obtained by the normal operation of a driving roll moving in a circular path.

In Fig. 4 of the drawings, the roll 34 has reached the end of the straight portion of the control cam, and from this point on there is little shifting of the roll 32 until it finally remains in a fixed position relative to the center of rotation of the arm 27.

By the mounting of the actuating roll 32 on a shifting bracket so that it may be moved in toward the center of rotation of the arm on which it is supported and out from said center, the radial slots in the driving wheel may be set one hundred and twenty degrees apart. It will be noted that the path of travel of the roll 32 as it enters the radial slot is so far out from the center of rotation of the arm 27 that it would pass beyond the axis of rotation of the driving wheel. By mounting the bracket so that it can be shifted, and the position of the roll 32 varied relative to the center of rotation of the arm 27, the inward extent of movement of the roll or the inner end of the radial slot, is well away from the center of rotation of said driven wheel.

It will be noted from the above that there are two advantages derived from the mounting of the actuating roll so that it may be shifted relative to the center about which it rotates. In the first place, the shifting of the roll will vary the differential movement imparted to the driving wheel, thus producing an irregular differential movement therein, and in the second place, the driving wheel can be rotated once while the actuating shaft rotates three times, and therefore, a relatively long time interval between the step movements imparted to the driving wheel may be obtained. This is of great importance where it is desired to move a can into an operating station and permit it to remain there for a relatively long period for operation thereon before it is removed.

In order that the arm 27 may be adjusted to different set positions on the actuating shaft therefor, the hub of the sleeve shaft 21 is provided with a worm gear 40. Journaled in spaced members 41, 41 formed in the arm is a shaft carrying a spiral gear 42. This spiral gear 42 meshes with the worm gear 40. Any suitable means may be attached to the slabbed end 43 of this shaft for the turning of the same. When it is desired to adjust the arm, the bolts 26 are loosened. Then the shaft is turned, and this will shift the arm 27 to a different angular position on the shaft. This is for the purpose of timing the intermittent motion relative to the actuating shaft therefor.

The driven wheel may be held from rotation when released by the driving member in any suitable way. In the construction shown in Figures 1 to 9, inclusive, the locking of the driven member is accomplished by the locking of the turret which is operated by the driven member in a set position. The can support lifting the can into the seaming mechanism, moves up into the pocket of the turret and thus prevents the turret from turning. In Figures 10 to 13, inclusive, there is shown a locking mechanism which is similar to the ordinary Geneva locking mechanism for holding the driven part from turning. In this form of the invention, the sleeve 8 is provided with a spider 44 having three arms 45, 46 and 47 which overlie the slots 13, 14 and 15, respectively. The spider between the ends of the arms is curved. Fixed to the sleeve 21 of the driving member is a locking disk 48. This locking disk 48 is circular in outline with the center of the circle at the axis of rotation of the driving member. From the point $a$ to the point $b$, the disk is cut away so as to provide a clearance space into which the arms of the spider may move. The curvature of the face of the spider between the ends of the arms is the same radius as the curvature of the disk 48. When the parts are in the position shown in Fig. 11, the periphery of the disk 48 contacts with the curved surface between the ends of the arms 46 and 47. When the driving member, however, reaches the position in this Fig. 11, then the point $b$ is passing a line through the centers of the driving member and the driven member, and therefore, the curved surface of the disk will move away from the curved surface of the spider. At this time, the roll 32 has moved into the slot 15, so that the driven member begins its intermittent movement. The arm 47 moves into the clearance space between the points $a$ and $b$ on the disk 48 and is free to rotate. The driven member is shown as having moved through an angle of sixty degrees, and it is noted that the arm 47 has a free swinging movement in the clearance space formed in the disk. When the parts reach the position shown in Fig. 13, then the roll 32 which is actuating the driven member, is leaving the slot 15 and releasing its driving connection on the driven member. The point $a$ has now reached the line passing through the centers of the driving and driven members, and the curved face of the spider between the arms 47 and 45 has been brought into contact with the peripheral face of the holding disk 48. From this point on, the holding disk will lock the driven member so that it will be held in the fixed position to which it was turned by the roll 32, and as the roll leaves the slot 15 and makes it travel around the axis of the driving member, preparatory to entering the slot 13, said driven member will be held from movement. Further detail description of the holding means is not thought necessary, as the invention in the present case is more particularly in the driving means for the driven member.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. An intermittent motion transmitting device comprising a member to be intermittently rotated, a driving wheel attached thereto and having radially extending slots opening at the periphery of the wheel, a continuously rotating member, an arm rotating therewith, means movably carried by said arm and projecting laterally therefrom, a roll mounted on said laterally projecting means and adapted to move in succession into said radial slots for imparting intermittent rotation to said wheel, and means whereby the laterally projecting position of said roll supporting means may be shifted toward and from the center of said wheel while imparting motion thereto.

2. An intermittent motion transmitting device comprising a member to be intermittently rotated, a driving wheel attached thereto and having radially extending slots opening at the periphery of the wheel, a continuously rotating member, an arm rotating therewith, means movably carried by said arm and projecting laterally therefrom, a roll mounted on said laterally projecting means and adapted to move in succession into said radial slots for imparting intermittent rotation to said wheel, a second roll carried by laterally projecting means, and a control cam operating thereon for shifting the same toward and from the center of the wheel while imparting motion thereto.

3. An intermittent motion transmitting device comprising a member to be intermittently rotated, a driving wheel attached thereto and having radially extending slots opening at the periphery of the wheel, a continuously rotating member, an arm rotating therewith, a laterally projecting bracket pivoted to the outer end of said arm, a roll mounted on said laterally projecting bracket and adapted to move in succession into said radial slots for imparting intermittent rotation to said wheel, and means whereby the laterally projecting position of the bracket may be shifted toward and from the center of said wheel while imparting motion thereto.

4. An intermittent motion transmitting device comprising a member to be intermittently rotated, a driving wheel attached thereto and having radially extending slots opening at the periphery of the wheel, a continuously rotating member, an arm rotating therewith, a laterally projecting bracket pivoted to the outer end of said arm and extending substantially at right angles to said arm, a roll mounted on the outer end of said bracket and adapted to move in succession into said radial slots for imparting intermittent rotation to said wheel, and means for shifting said bracket to different set positions on said arm during the rotation of said arm.

5. An intermittent motion transmitting device comprising a member to be intermittently rotated, a driving wheel attached thereto and having radially extending slots opening at the periphery of the wheel, a continuously rotating member, an arm rotating therewith, a laterally projecting bracket pivoted to the outer end of said arm and extending substantially at right angles to said arm, a roll mounted on the outer end of said bracket and adapted to move in succession into said radial slots for imparting intermittent rotation to said wheel, a second roll carried at the outer end of said bracket, and a control cam in which said second roll moves, said control cam determining the position of said bracket on said arm.

OTTO A. SCHMITT.